(12) United States Patent
Croy et al.

(10) Patent No.: US 11,417,882 B2
(45) Date of Patent: Aug. 16, 2022

(54) LITHIUM BATTERY ELECTRODES

(71) Applicant: UCHICAGO ARGONNE, LLC, Chicago, IL (US)

(72) Inventors: Jason Croy, Plainfield, IL (US); Arturo Gutierrez, Naperville, IL (US); Michael M. Thackeray, Naperville, IL (US); Meinan He, Willowbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 59 days.

(21) Appl. No.: 16/914,565

(22) Filed: Jun. 29, 2020

(65) Prior Publication Data

US 2020/0335785 A1 Oct. 22, 2020

Related U.S. Application Data

(62) Division of application No. 15/909,691, filed on Mar. 1, 2018, now Pat. No. 10,741,839.

(60) Provisional application No. 62/466,070, filed on Mar. 2, 2017.

(51) Int. Cl.
| | |
|---|---|
| *H01M 4/00* | (2006.01) |
| *H01M 4/525* | (2010.01) |
| *C01G 53/00* | (2006.01) |
| *H01M 4/505* | (2010.01) |
| *H01M 10/0525* | (2010.01) |
| *H01M 10/0568* | (2010.01) |
| *H01M 10/0567* | (2010.01) |
| *C01G 45/12* | (2006.01) |
| *H01M 4/02* | (2006.01) |

(52) U.S. Cl.
CPC ........ *H01M 4/525* (2013.01); *C01G 45/1257* (2013.01); *C01G 53/50* (2013.01); *H01M 4/505* (2013.01); *H01M 10/0525* (2013.01); *H01M 10/0567* (2013.01); *H01M 10/0568* (2013.01); *C01P 2002/22* (2013.01); *C01P 2002/32* (2013.01); *C01P 2002/85* (2013.01); *C01P 2004/82* (2013.01); *C01P 2006/40* (2013.01); *H01M 2004/028* (2013.01); *H01M 2300/0025* (2013.01)

(58) Field of Classification Search
CPC .. H01M 4/505; H01M 4/525; H01M 10/0568; H01M 10/0525
USPC .................................................... 429/231.95
See application file for complete search history.

(56) References Cited

U.S. PATENT DOCUMENTS

| | | | |
|---|---|---|---|
| 5,153,081 A | 10/1992 | Thackeray et al. | |
| 5,316,877 A | 5/1994 | Thackeray et al. | |
| 5,981,106 A | 11/1999 | Amine et al. | |
| 6,482,374 B1 | 11/2002 | Kumar et al. | |
| 6,677,082 B2 | 1/2004 | Thackeray et al. | |
| 6,680,143 B2 | 1/2004 | Thackeray et al. | |
| 7,314,682 B2 | 1/2008 | Thackeray et al. | |
| 7,326,498 B2 | 2/2008 | Park et al. | |
| 7,468,223 B2 | 12/2008 | Thackeray et al. | |
| 9,593,024 B2 | 3/2017 | Thackeray et al. | |
| 2003/0108790 A1 | 6/2003 | Manthiram et al. | |
| 2004/0005265 A1 | 1/2004 | Chiang et al. | |
| 2009/0136839 A1 | 5/2009 | Kraznov et al. | |
| 2009/0224212 A1 | 9/2009 | Manthiram et al. | |
| 2010/0086853 A1 | 4/2010 | Venkatachalam et al. | |
| 2010/0207577 A1 | 8/2010 | Sugiyama et al. | |
| 2015/0180031 A1* | 6/2015 | Thackeray .......... | H01M 10/052 429/149 |

FOREIGN PATENT DOCUMENTS

| | | |
|---|---|---|
| EP | 2139058 A1 | 12/2009 |
| GB | 2234233 A | 1/1991 |
| WO | 2009082492 A2 | 7/2009 |

OTHER PUBLICATIONS

Abraham, D.P. et al., Effect of Electrolyte Composition on Initial Cycling and Impedance Characteristics of Lithium-Ion Cells, Journal of Power Sources 180, 612-620 (2008).
Amatucci, G. et al., Optimization of Insertion Compounds Such as LiMn2O4 for Li-Ion Batteries, Journal of the Electrochemical Society, 149 (12), K31-K46, (2002).
Choi, W. et al., Superior Capacity Retention Spinel Oxyfluoride Cathodes for Lithium-Ion Batteries, Electrochemical and Solid State Letters, 9 (5), A245-A248 (2006).
Croy, J.R. et al., Prospects for Spinel-Stabilized, High-Capacity Lithium-Ion Battery Cathodes, Journal of Power Sources 334, 213-220 (2016).
Gummow, R.J. et al., Improved Capacity Retention in Rechargeable 4 V Lithium/Lithium-Manganese Oxide (Spinel) Cells, Solid State Ionics 69, 59-67 (1994).
Johnson, C.S. et al., Anomalous Capacity and Cycling Stability of xLi2MnO3 • (1-x)LiMO2 Electrodes (M=Mn, Ni, Co) in Lithium Batteries at 50° C., Electrochemistry Communications 9, 787-795 (2007).
Johnson, C.S. et al., Lithium-Manganese Oxide Electrodes With Layered-Spinel Composite Structures xLi2MnO3 • (1-x) Li1+yMn2-yO4 (0<x<1, 0≤y≤0.33) for Lithium Batteries, Electrochemistry Communications 7, 528-536 (2005).

(Continued)

*Primary Examiner* — Steven J Bos

(74) *Attorney, Agent, or Firm* — Olson & Cepuritis, Ltd.

(57) ABSTRACT

Electrode materials for electrochemical cells and batteries and methods of producing such materials are disclosed herein. The electrode materials comprise an active lithium metal oxide material prepared by: (a) contacting the lithium metal oxide material with an aqueous acidic solution containing one or more metal cations; and (b) heating the so-contacted lithium metal oxide from step (a) to dryness at a temperature below 200° C. The metal cations in the aqueous acidic solution comprise one or more metal cations selected from the group consisting of an alkaline earth metal ion, a transition metal ion, and a main group metal ion.

8 Claims, 12 Drawing Sheets

(56) References Cited

OTHER PUBLICATIONS

Johnson, C.S. et al., The Significance of the Li2MnO3 Component In Composite xLi2MnO3.(1-x)LiMn0.5Ni0.5O2 Electrodes, Electrochemistry Communications 6, 1085-1091 (2004).

Kim, J.S. et al., The Electrochemical Stability of Spinel Electrodes Coated with ZrO2, Al2O3, and SiO2 From Colloidal Suspensions, Journal of the Electrochemical Society 151, (10) A1755-A1761 (2004).

Kim, J. et al., Electrochemical and Structural Properties of xLi2M'O3 • (1-x)LiMn0.5Ni0.5O2 Electrodes for Lithium Batteries (M'=Ti, Mn, Zr; 0≤x ≤0.3), Chemical Materials 16, 1996-2006 (2004).

Kim, D. et al., High-Energy and High Power Li Rich Nickel Manganese Oxide Electrode Materials, Electrochemistry Communications 12, 1618-1621 (2010).

Long, B.R. et al., Advances in Stabilizing 'Layered-Layered' xLi2MnO3.(1-x)LiMO2 (M=Mn, Ni, Co) Electrodes With A Spinel Component, Journal of The Electrochemical Society 161 (14), A2160-A2167 (2014).

Thackeray, M.M. et a., Advances In Manganese-Oxide Composite Electrodes for Lithium-Ion Batteries, Journal of Materials Chemistry, 15, 2257-2267 (2005).

Thackeray, M.M. et al., Li2MnO3-Stablized LiMO2 (M=Mn, Ni, Co) Electrodes for Lithium-Ion Batteries, Journal of Materials Chemistry 17, 3112-3125 (2007).

Van Der Ven, A. et al., Ordering in Lix(Ni0.5Mn0.5)O2 and Its Relation to Charge Capacity and Electrochemical Behavior In Rechargeable Lithium Batteries, Electrochemistry Communications 6, 1045-1050 (2004).

Zhu, Y. et al., Positive Electrode Passivation by LiDFOB Electrolyte Additive in High-Capacity Lithium-Ion Cells, Journal of The Electrochemical Society 159 (12), A2109-A2117 (2012).

\* cited by examiner

LITHIUM BATTERY ELECTRODES

CROSS-REFERENCE TO RELATED APPLICATIONS

This application is a divisional of U.S. application Ser. No. 15/909,691, filed on Mar. 1, 2018, which claims priority benefit of U.S. Provisional Application Ser. No. 62/466,070, filed on Mar. 2, 2017, each of which is incorporated herein by reference in its entirety.

STATEMENT OF GOVERNMENT INTEREST

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrode materials for electrochemical cells and batteries. Such cells and batteries are used widely to power numerous devices, for example, portable electronic appliances and medical, transportation, aerospace, and defense systems.

SUMMARY OF THE INVENTION

Electrode materials (anodes and cathodes) for electrochemical cells and batteries are described herein. In particular, metal oxide electrode materials for lithium cells and batteries, preferably lithium-metal-oxide electrode materials, are described, which predominantly have layered-type structures, rock salt-type structures, or spinel-type structures, or combinations or modifications thereof. More specifically, an effective method to protect and/or enhance the surface of the metal oxide or lithium metal oxide electrode materials is described. For example, a solution of a strong acid such as nitric acid, containing at least one stabilizing metal cation, such as aluminum, zirconium, magnesium, cobalt or nickel, is applied to the surface of the metal oxide or lithium metal oxide, thereby protecting the surface of the electrode materials from undesirable effects in electrochemical cells, such as electrolyte oxidation, oxygen loss, and/or dissolution. Such surface protection/coating significantly enhances the surface stability, rate capability and cycling stability of the electrodes, which leads to increased electrode capacity and energy of the cells. Surface protected electrode materials made by the method, preferably for lithium- or lithium-ion cells and batteries, also are described. The electrodes and electrode materials described herein can be used either in primary or rechargeable cells and batteries.

In one aspect, the electrode materials comprise a layered-type structure, a spinel-type structure, a rock salt-type structure, or a combination of these structure types, for example, an integrated/composite structure comprising one or more of these structure types. As used herein, layered compounds and structures refer broadly to lithium metal oxides of formula $Li_zMO_{(z+1)}$ (z=1 or 2) or substituted derivatives thereof, in which M is one or more metal ions (e.g., transition metals), the structures of which comprise alternating layers of lithium ions interspersed with layers containing other metal ions, M. The layers containing the M metal ions preferably contain lithium ions such that the Li:M ratio is >1 (e.g., 1.001 to 2), in which case the electrode is considered to be lithium rich. In an additional preferred embodiment, the M cations comprise manganese, nickel and/or cobalt ions such that the Mn content is greater than, or equal to, the Ni content or greater than the nickel plus cobalt content, in which cases, the electrode is considered to be manganese rich. In yet another preferred embodiment, the electrode is both lithium and manganese rich.

Typical non-limiting examples of layered cathode materials in their pristine, untreated state include, for example, by layered $Li_zMO_{(z+1)}$, where z=1 or 2, and M is, e.g., Mn, Ni and Co, such as $LiCoO_2$ in which layers of lithium ions alternate with layers of cobalt ions in a close-packed oxygen array; and $Li_2MnO_3$ in which layers of lithium alternate with layers of manganese and lithium ions in a close-packed oxygen array. Rock salt compounds and structures or components of structures, include, e.g., M'O, in which the M' to O ratio is ideally 1:1, and in which M' is one or more metal ions (including lithium) that have close-packed structures. Additionally, M'O components within layered or spinel structures, e.g., NiO, also are included within the present methods and materials. Spinel compounds and structures refer broadly to the family of close-packed lithium metal oxides, $Li[M''_2]O_4$, in which the metal:oxygen (Li+M''):O ratio ideally is 3:4 (i.e., 0.75:1), or cation or anion substituted derivatives thereof, in which M'' is one or more metal ions, as exemplified by the spinel cathode system $Li_{1+n}Mn_{2-n}O_4$ (0≤n≤0.33) and the lithium titanate anode system $Li_4Ti_5O_{12}$ ($Li[Li_{1/3}Ti_{5/3}]O_4$ and substituted derivatives thereof. Lithiated spinel compounds refer to $Li_2[M''_2]O_4$, e.g., where M''=Mn, Co, Ti and the like, and substituted derivatives thereof.

It is to be understood that, in practice, deviations from ideal crystallographic behavior of these structure types are commonplace, such as variations in composition, in atomic positions and coordination sites within crystal structures, as well as in the site occupancy of atoms and in the structural disorder of atoms on different sites. Such crystallographic deviations and imperfections that can give rise to non-ideal cation arrangements in stoichiometric and/or defect layered, spinel and rock salt components of the electrode structures, particularly at grain or particle boundaries, within or at the surface of individual component structures, are therefore necessarily included within the definitions provided above and within the spirit and scope of this invention. Generally speaking, the compositional and structural space of the electrodes of this invention can be defined and represented by phase diagrams of layered, spinel and rock salt structures, allowing for crystallographic imperfections such as cation disorder, stacking faults, and structural defects and vacancies, for example, localized non-stoichiometry, as described above.

A unique aspect of the surface treatment method described herein is that the method has been discovered to work remarkably effectively at low heating and drying temperatures, e.g., approximately 100° C. or slightly higher (e.g., about 110° C.), for selected compositions and structures, and particularly for lithium- and manganese-rich lithium metal oxide electrode compositions and structures that are comprised of lithium, manganese and nickel ions in which the manganese content is higher than, or equal to, the nickel content.

Non-limiting examples of certain embodiments of the methods and materials described herein include:

Embodiment 1, which is a method of preparing an active lithium metal oxide material suitable for use in an electrode for a lithium electrochemical cell, the method comprising the steps of: contacting the lithium metal oxide material with an aqueous acidic solution containing one or more metal cations; and heating the so-contacted lithium metal oxide from step (a) to dryness at a temperature below 200° C.; and wherein the metal cations in the aqueous acidic solution comprise one or more metal cations selected from the group consisting of an alkaline earth metal ion, a transition metal ion, and a main group metal ion.

Embodiment 2, which is the method of embodiment 1, wherein the temperature in step (b) is less than 150° C.

Embodiment 3, which is the method of embodiment 1, wherein the temperature in step (b) is less than 120° C.

Embodiment 4, which is the method of embodiment 1, wherein the temperature in step (b) is 100° C. or less.

Embodiment 5, which is the method of embodiment 1, wherein the aqueous acidic solution has a pH in the range of about 4 to about 7.

Embodiment 6, which is the method of embodiment 1, wherein the lithium metal oxide material in step (a) is a compound with a layered structure, a spinel structure, a rock salt structure, a blend of two or more of the foregoing structures, or a structurally-integrated composite of two or more of the foregoing structures.

Embodiment 7, which is the method of embodiment 6, wherein the lithium metal oxide material comprises a compound with a structurally-integrated 'layered-layered' structure comprising $xLi_2MnO_3 \cdot (1-x)LiMO_2$ or a 'layered-layered-spinel' structure comprising $y[xLi_2MnO_3 \cdot (1-x)LiMO_2] \cdot (1-y)LiM''_2O_4$, in which M and M'' comprise one or more metal ions for $0<x<1$ and $0<y<1$.

Embodiment 8, which is the method of embodiment 7, wherein one or more of the structures of the lithium metal oxide electrode are imperfect and characterized by one or more imperfections including cation disorder, stacking faults, dislocations, structural defects and vacancies, and localized non-stoichiometry.

Embodiment 9, which is the method of embodiment 7, wherein the Li, Mn, M, and M'' cations are partially disordered over octahedral and tetrahedral sites of the layered and spinel components of the lithium metal oxide structure.

Embodiment 10, which is the method of embodiment 7, wherein M and M'' comprise one or more metals selected from of Mn, Ni, and Co, and optionally, one or more other metals selected from Al, Mg and Li.

Embodiment 11, which is the method of embodiment 7, wherein the lithium metal oxide material comprises Mn and Ni in an atomic ratio of Mn:Ni greater than or equal to 1.

Embodiment 12, which is the method of embodiment 7, wherein the lithium metal oxide material comprises Mn, Ni and Co in an atomic ratio of Mn:(Ni+Co) greater than or equal to 1.

Embodiment 13, which is the method of embodiment 1, wherein the metal cations in the aqueous acidic solution comprise one or more metal cations selected from the group consisting of aluminum ion, magnesium ion, cobalt ion, and nickel ion.

Embodiment 14, which is the method of embodiment 1, wherein the metal cations in the aqueous acidic solution comprise one or more metal cations selected from the group consisting of zirconium and aluminum ions.

Embodiment 15, which is the method of embodiment 1, wherein the aqueous acidic solution is a metal nitrate solution.

Embodiment 16, which is the method of embodiment 15, wherein the metal nitrate comprises aluminum nitrate, zirconium nitrate or a combination thereof.

Embodiment 17, which is an electrode for a non-aqueous electrochemical cell comprising an active lithium metal oxide material prepared by the method of embodiment 1.

Embodiment 18, which is the electrode of embodiment 17, in which the active lithium metal oxide material exhibits a peak of about 531.5 eV adjacent a peak at about 529.5 eV in an X-ray photoelectron spectroscopy (XPS) spectrum of the material.

Embodiment 19, which is an electrochemical cell comprising a cathode, an anode, a separator membrane between the cathode and the anode, and a lithium-containing electrolyte contacting the anode, the cathode, and the membrane, wherein either the anode or the cathode is the electrode of embodiment 17.

Embodiment 20, which is the electrochemical cell of embodiment 19, wherein the electrolyte comprises up to about 1 percent by weight (e.g., about 0.01 to about 1 wt %; or 0.05 to about 0.75 wt %; or about 0.1 to about 0.5 wt %) of lithium difluoro(oxalate)borate (LiDFOB).

Embodiment 21, which is a battery containing more than one electrochemical cell of embodiment 19, connected in series, in parallel, or in both series and parallel.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION OF THE PREFERRED EMBODIMENTS

Figure 1:
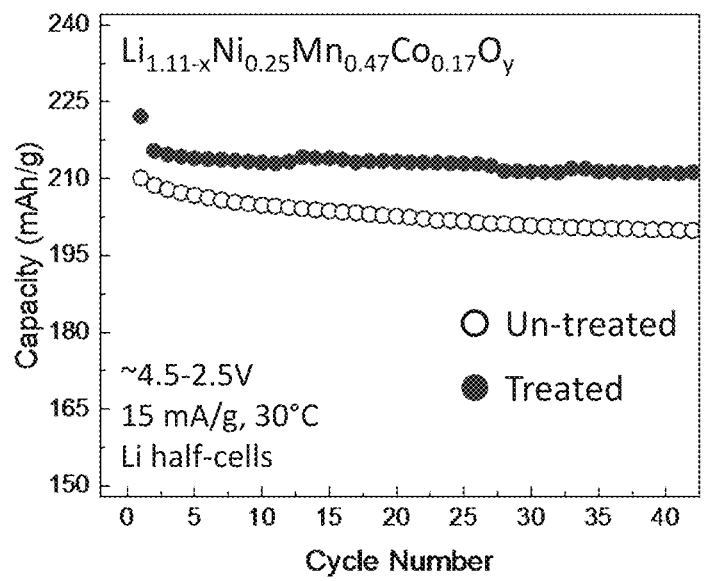
FIG. 1 depicts capacity versus cycle number plots for untreated (open symbols) and Al-treated (closed symbols) 'layered-layered-spinel' (LLS) electrodes in Li half-cells when cycled between 4.5 V and 2.5 V after a first-cycle activation between 4.6 and 2.0 V (15 mA/g, 30° C.).

State-of-the-art lithium-ion battery electrode materials do not meet next-generation targets for transportation applications. The highly correlated parameters of energy and lifetime are of particular significance and still need to be greatly improved. Several strategies to improve energy densities have been pursued including the incorporation of "excess" capacity, relative to typical layered $Li_zMO_{(z+1)}$ (z=1 or 2, M=Mn, Ni, Co), spinel $LiMn_2O_4$, and olivine $LiFePO_4$ cathode materials. Specifically, the integration of layered $Li_2MnO_3$ to create structurally-integrated composite 'layered-layered' electrode structures (e.g., $xLi_2MnO_3 \cdot (1-x)LiMO_2$, where 0<x<1 and 0<y<1) has shown particular promise for enhancing the energy content of lithium cells. However, 'layered-layered' electrodes undergo structural transformations with cycling leading to a large irreversible first-cycle capacity, surface damage, and modification of the discharge and charge voltage profile with cycling, commonly referred to as voltage fade. Voltage fade causes a cycle-to-cycle decrease in the average energy output of cells and is a challenge yet to be overcome. The incorporation of local spinel, or spinel-like, configurations to form multi-component, structurally-integrated 'layered-layered-spinel' electrode materials such as $y[xLi_2MnO_3 \cdot (1-x)LiMO_2] \cdot (1-y)LiM''_2O_4$ (where 0<x<1, 0<y<1, and M and M'' are predominately transition metals) has shown promise in addressing some of these limitations and to access higher capacities at high charging potentials (>4.4 V vs. $Li^0$), which is above the typical upper charging limit of commercial lithium-ion cells. Specifically, the first-cycle efficiency can be increased, the rate capability improved, and the voltage fade mitigated, at least to some extent. Despite these improvements, a major challenge that remains is to stabilize the surfaces of these cathode materials at high potentials during charge at which electrode/electrolyte reactions can lead to impedance rise, loss of electrochemically active lithium, and shortened cell lifetimes.

Note that the rock salt compounds and structures, or components of structures, referred to in this specification relate broadly to metal oxides, M'O, in which the M' to O ratio ideally is 1:1 and in which M' is one or more metal ions (including, e.g., transition metals and lithium) that have close-packed structures typified, for example, by layered $Li_zMO_{(z+1)}$ compounds (z=1 or 2, M=Mn, Ni, Co, etc.), lithiated spinel compounds (e.g., $Li_2[M''_2]O_4$, where M''=Co, Ti) and substituted derivatives thereof, and by M'O components within layered and lithiated spinel structures, e.g., NiO. Spinel compounds and structures refer broadly to the family of close-packed lithium metal oxides, e.g., $Li[M''_2]O_4$, or cation or anion substituted derivatives thereof, in which the (Li+M''):O ratio is ideally 3:4 (i.e., 0.75:1). Examples of $Li[M''_2]O_4$ spinel anode and cathode electrode structures, in which M'' is one or more metal ions (e.g., Mn, Ti and the like), are the spinel cathode system $Li_{1+n}Mn_{2-n}O_4$ (0≤n≤0.33) and the lithium titanate anode system $Li_4Ti_5O_{12}$ ($Li[Li_{1/3}Ti_{5/3}]O_4$, and substituted derivatives thereof. It therefore stands to reason that structurally-integrated electrode structures such as $xLiMO_2 \cdot (1-x)Li[M''_2]O_4$ (where 0<x<1) will ideally have a total (Li+M+M''):O ratio between 1:1 and 0.75:1. In practice, however, the variations in the oxygen content may be accommodated by changes in the oxidation state of the M cations, thereby making a precise determination of the total metal to O ratio in the electrodes of this invention difficult.

In a further embodiment, the lithium metal oxide electrode structures produced by the methods described herein can be imperfect and characterized by one or more imperfections, for example, cation disorder, stacking faults, dislocations, structural defects and vacancies, and localized non-stoichiometry.

One preferred embodiment is a processing method to modify the surface and enhance the surface stability of lithium metal oxide cathode materials with layered, spinel or multi-component combinations thereof as described above, for primary or secondary lithium cells and batteries, or lithium-ion cells and batteries. Important features of this processing method, relative to typical strategies, are: (1) the compositional-dependence for which surface modifications prove effective; (2) treatment of layered, 'layered-layered', and 'layered-layered-spinel' cathodes under acidic conditions to improve, symbiotically, surface stability and first-cycle efficiency; and (3) the use of low temperature heating/drying step, at or below 200° C., preferably below approximately 150° C., more preferably below approximately 120° C., and most preferably at approximately 100° C. or below, optionally under vacuum, that lead to novel and effective surface structures. The duration of the heating step should be as short as possible, preferably less than approximately 24 hours, more preferably less than approximately 12 hours, and most preferably less than approximately 8 hours or shorter. The surface treatment of the electrodes under acidic conditions preferably takes place in the presence of nitrate ions and one or more soluble, surface stabilizing metal cations, for example, aluminum and/or zirconium ions.

A unique aspect of the method described herein is that the surface treatment method has been discovered to work effectively for selected compositions and structures, and particularly for lithium and manganese-rich lithium metal oxide electrode compositions and structures that are comprised of lithium, manganese and nickel ions in which the manganese content is higher than, or equal to, the nickel content. Likewise, in another embodiment, lithium and manganese-rich lithium metal oxide electrode compositions and structures comprised of lithium, manganese, nickel and cobalt ions are preferred when the manganese content is higher than, or equal to, the combined nickel and cobalt content (based on atomic ratios of the metals).

Another embodiment of the present method is to modify the surface and enhance the surface stability of lithium metal oxide anode materials with layered and spinel structures, as described above, for example, a lithium titanate spinel, $Li_4Ti_5O_{12}$, or substituted variations thereof, that are known to undergo gassing at the surface during electrochemical reactions.

In another aspect, electrochemical cells comprising the treated cathode materials are enhanced by addition of small amounts (e.g., about 0.01 to about 0.5 wt %) of additives such as LiDFOB to the electrolyte. The LiDFOB has a surprising synergistic effect with the low temperature metal surface treatments described herein to markedly improve the performance of the Al-treated cells. For example, capacity retention and coulombic efficiencies are improved over the baseline and Al-treated cells without LiDFOB, and impedance rise is curtailed with the LiDFOB added to the electrolyte in combination with the surface treatment of the cathode material, especially with structurally-integrated composite metal oxides such as 'layered-layered' (LL), 'layered-spinel' (LS) and 'layered-layered-spinel' lithium metal oxide materials, which are well known in the art; e.g., an LLS such as $0.25Li_2MnO_3 \cdot (1-x)LiMn_{0.375}Ni_{0.375}Co_{0.25}O_2$, with a targeted 15% spinel content.

As used herein, a structurally-integrated composite metal oxide is a material that includes domains (e.g., locally ordered, nano-sized or micro-sized domains) indicative of different metal oxide compositions having different crystalline forms (e.g., layered or spinel forms) within a single particle of the composite metal oxide, in which the domains share substantially the same oxygen lattice and differ from each other by the elemental and spatial distribution of metal ions in the overall metal oxide structure. Structurally-integrated composite metal oxides are different from and generally have different properties than mere mixtures of two or more metal oxide components (for example, mere mixtures do not share a common oxygen lattice).

The lithium metal oxide materials can be incorporated in a lithium ion electrochemical cell in a positive electrode (cathode) or a negative electrode (anode). Such cells also typically include a separator between the cathode and anode, with an electrolyte in contact with both the anode and cathode, as is well known in the battery art. A battery can be formed by electrically connecting two or more such electrochemical cells in series, parallel, or a combination of series and parallel. Electrochemical cell and battery designs and configurations, anode and cathode materials, as well as electrolyte salts, solvents and other battery or electrode components (e.g., separator membranes, current collectors), which can be used in the electrolytes, cells and batteries described herein, are well known in the lithium battery art, e.g., as described in "Lithium Batteries Science and Technology" Gholam-Abbas Nazri and Gianfranco Pistoia, Eds., Springer Science+Business Media, LLC; New York, N.Y. (2009), which is incorporated herein by reference in its entirety.

Example 1

A 'layered-layered-spinel' electrode, was synthesized as described by Long et al. in the *Journal of the Electrochemical Society*, Volume 161, pages A2160-A2167 (2014) by underlithiating a composition of a nominal 'layered-layered' $Li_{1.11}Mn_{0.47}Ni_{0.25}Co_{0.17}O_2$ material (alternatively, in composite notation, $0.25Li_2MnO_3 \cdot 0.75LiMn_{0.375}Ni_{0.375}Co_{0.25}O_2$ or normalized notation, $Li_{1.25}Mn_{0.53}Ni_{0.28}Co_{0.19}O_{2.25}$ to produce a 'layered-layered-spinel' composition with a targeted 15% spinel content with respect to a 'layered-layered-spinel' compositional phase diagram in which the Mn:Ni:Co ratio was 0.47:0.25:0.17 and in which the Li to total M (Mn+Ni+Co) ratio was >1. The 'layered-layered-spinel' material was subsequently treated in an acidic aluminum nitrate solution followed by drying the product in air at approximately 110° C. for approximately 12 hours without a higher temperature annealing step, in accordance with the principles of this invention. FIG. 1 shows capacity vs. cycle number plots for the untreated (open symbols) and Al-treated (closed symbols), 'layered-layered-spinel' electrode materials in Li half-cells between about 4.5 and about 2.5 V after a first-cycle activation between about 4.6 and about 2.0 V (15 mA/g, 30° C.).

The electrode material dried at 110° C. shows a significant increase in capacity as well as a superior capacity retention over more than 40 cycles relative to the untreated, baseline 'layered-layered' electrode material. In addition, the incorporation of a spinel component in 'layered-layered' electrodes significantly increases the first-cycle efficiency to about 92%, relative to the lower first-cycle efficiency of about 78% for a parent 'layered-layered' electrode with nominal composition $Li_{1.25}Mn_{0.53}Ni_{0.28}Co_{0.19}O_2$ (alternatively, in 'layered-layered' composite notation, $0.25Li_2MnO_3 \cdot 0.75LiMn_{0.375}Ni_{0.375}Co_{0.25}O_2$), as disclosed by Long et al. in the *Journal of the Electrochemical Society* publication, referenced above. As shown FIG. 1, the acidic Al-treatment of the electrode, further increases the first-cycle efficiency to about 94%, on par or better than state-of-the-art, layered lithium-nickel-manganese-cobalt-oxide (NMC) electrodes. The improved efficiency may be attributed to (1) better surface protection due to mitigated electrolyte interactions and/or (2) an unexpected symbiotic process of the acidic solution in leaching small amounts of Li and/or oxygen from the electrode surface. The leaching action described in point (2) above mimics the first-cycle electrochemical activation process well-known for Li- and Mn-rich materials in 'layered-layered' $xLi_2MnO_3 \cdot (1-x)LiMO_2$ (M=Ni, Mn and/or Co) systems. However, in combination with a 'layered-layered-spinel' electrode, the acid leaching (chemical activation) process helps to balance the inherent first-cycle lithium losses (due to activation of the Li-rich component, e.g., loss of $Li_2O$) and the amount of "extra" capacity that can be taken up on discharge by vacant lithium sites inherent to the integrated spinel or spinel-like component.

Example 2

Figure 2:
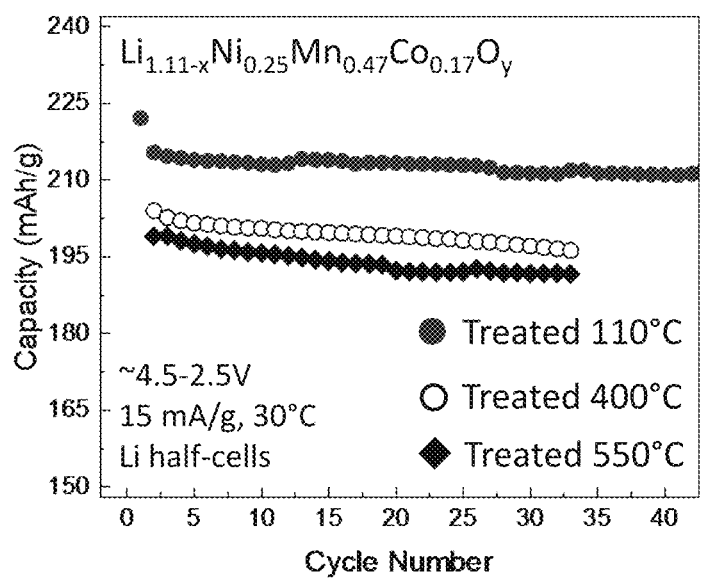
FIG. 2 depicts capacity versus cycle number plots for Al-treated, LLS electrodes in Li half-cells cycled between 4.5 and 2.5 V after a first-cycle activation between 4.6 and 2.0 V (15 mA/g, 30° C.); samples were treated at 110° C. (closed circles, this invention), 400° C. (open circles), or 550° C. (diamonds).

A unique, unexpected aspect of the method described herein is the combination of using (1) an aluminum nitrate solution to treat the surface of the lithium-metal-oxide electrode particles, (2) a relatively low drying temperature of approximately 110° C., and (3) a specifically defined lithium-metal-oxide electrode composition, which is lithium-rich and manganese-rich relative to the nickel (or nickel and cobalt) content, that significantly enhances the electrochemical properties of the electrode materials described and defined herein. For example, FIG. 2 shows capacity vs. cycle no. plots of the 'layered-layered-spinel' baseline electrode used for this investigation (FIG. 1), in which (a) the Mn:Ni:Co ratio is 0.47:0.25:0.17 and (b) the Li to total M ratio is >1 after treatment with an aluminum nitrate solution, followed by post-treatment annealing in air at 400° C. and 550° C., i.e., at temperatures typically used in the art to produce Al-protected surface layers relative to the capacity vs. cycle no. plot of the same electrode when heated only to 110° C. in accordance with the principles of this invention. FIG. 2 clearly demonstrates that annealing the electrodes at 400 and 500° C. adversely affects the performance of the lithium cells in terms of a degradation of capacity (energy) generation and cycling stability, whereas the electrodes dried at about 110° C., provide significantly enhanced capacity as well as superior cycling stability.

Example 3

Figure 3:
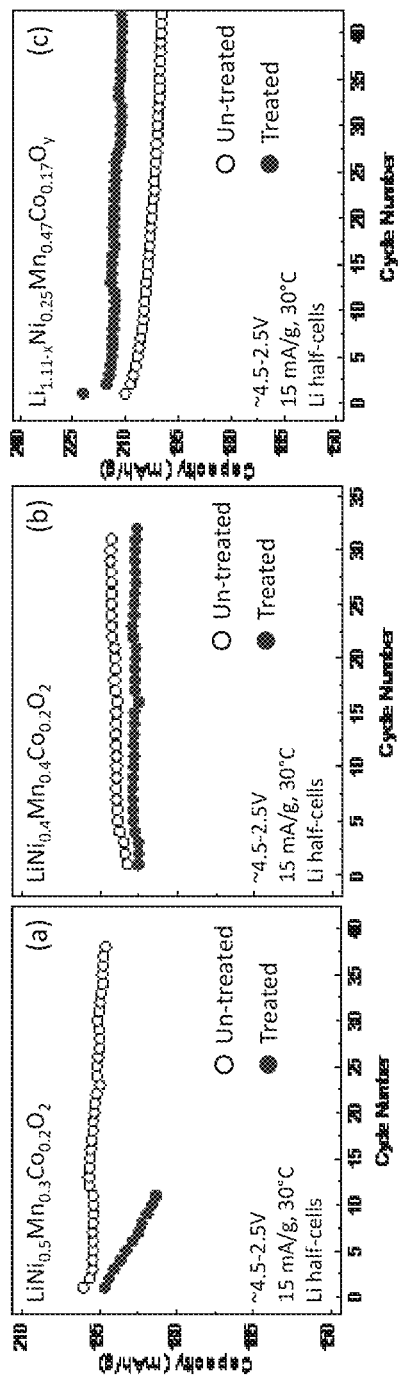
FIG. 3 depicts capacity versus cycle number plots for Al-treated electrodes, (a) NMC-532, (b) NMC-442, and (c) baseline LLS (Mn:Ni:Co=0.47:0.25:0.17) in Li half-cells cycled between 4.5 and 2.5 V after a first-cycle activation between 4.6 and 2.0 V (15 mA/g, 30° C.); all Al-treatments were performed (dried) at 110° C.

FIG. 3 shows how changing the composition, particularly the Li:M (M=Mn+Ni+Co) and Mn:Ni ratios in standard NMC electrode materials such as $LiNi_{0.5}Mn_{0.3}Co_{0.2}O_2$ (NMC-'532', FIG. 3, Panel (a) and $LiNi_{0.4}Mn_{0.4}Co_{0.2}O_2$ (NMC-'442', FIG. 3, Panel (b)) and how low-temperature (110° C.) Al-treatment impacts their electrochemical properties relative to 'layered-layered-spinel' electrodes of this invention, such as the lithium- and manganese-rich electrode, $Li_{1.1-y}Mn_{0.47}Ni_{0.25}Co_{0.17}O_y$ (FIG. 3, Panel (c)).

FIG. 3 clearly demonstrates that for the nickel-rich electrodes in which the Ni:Mn ratio is 5:3 and 1:1 (FIG. 3, Panels (a) and (b)), respectively, the Al-treatment is not as effective as it is for the lithium- and manganese-rich electrode in FIG. 3, Panel (c), the latter electrode providing a significantly higher rechargeable electrode capacity (about 210-215 mAh/g) than the nickel-rich electrodes (about 195 mAh/g) when cycled in Li half-cells cycled between 4.5 and 2.5 V after a first-cycle activation between 4.6 and 2.0 V (15 mA/g, 30° C.). Of particular note is that layered NMC-based materials, including $LiCoO_2$ and $LiMn_{0.5}Ni_{0.5}O_2$ also require surface protection in order to mitigate chemical and electrochemical interactions at the electrode/electrolyte interface. Furthermore, NMC electrodes are generally known to cycle well in Li half-cells, as shown by the performance of cells with untreated electrodes in FIG. 3, Panels (a) and (b). In particular, FIG. 3, Panel (b) indicates that Al-treatment of $LiNi_{0.4}Mn_{0.4}Co_{0.2}O_2$ (Ni:Mn=1:1) at 110° C. does not limit the rechargeable capacities as it does in $LiNi_{0.5}Mn_{0.3}Co_{0.2}O_2$ (Ni:Mn=1.67) in FIG. 3, Panel (a), and therefore can be a viable option for treating electrode materials with a high Mn content relative to Ni, and layered $LiCo_{1-x}Ni_xO_2$ materials with a Co:Ni greater than 1:1 (i.e., 0≤x<0.5), including $LiCoO_2$. FIG. 3, Panel (c) clearly demonstrates that the lithium- and manganese-rich 'layered-layered-spinel' electrode composition with a Mn:Ni ratio of approximately 2:1 benefits from the low-temperature, acidic Al-treatment in accordance with the methods described herein.

Example 4

Figure 4:
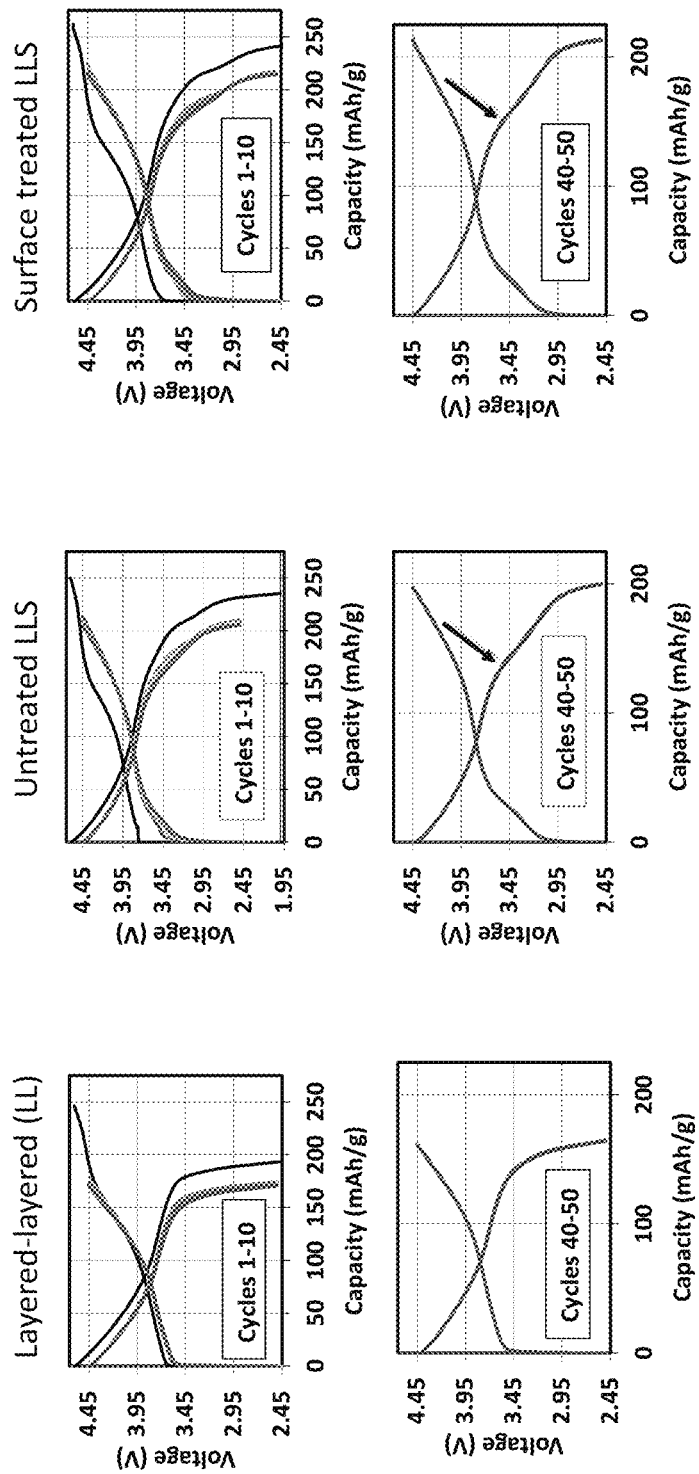
FIG. 4 depicts electrochemical profiles of lithium half cells containing an untreated 'layered-layered' (LL) $0.25Li_2MnO_3 \cdot 0.75LiMn_{0.375}Ni_{0.375}Co_{0.25}O_2$ electrode (left), an untreated, underlithiated LLS derivative of LL $0.25Li_2MnO_3 \cdot 0.75LiMn_{0.375}Ni_{0.375}Co_{0.25}O_2$ (middle), and an Al-surface treated LLS derivative of LL $0.25Li_2MnO_3 \cdot 0.75LiMn_{0.375}Ni_{0.375}Co_{0.25}O_2$ (right).

The electrochemical profiles of lithium half cells containing a parent 'layered-layered' electrode of nominal composition $0.25Li_2MnO_3 \cdot 0.75LiMn_{0.375}Ni_{0.37}Co_{0.375}O_2$ (alternatively, in normalized notation, $Li_{1.11}Mn_{0.47}Ni_{0.25}Co_{0.17}O_2$) and underlithiated 'layered-layered-spinel' derivatives containing a targeted 15% spinel content, one of which was subjected to Al-surface treatment in an acidic aluminum nitrate solution followed by drying in air at about 110° C., are shown in FIG. 4. Li half-cells were cycled between 4.5 and 2.5 V after a first-cycle activation between 4.6 and 2.0 V (15 mA/g, 30° C.). In FIG. 4, electrochemical profiles of lithium half cells containing an untreated 'layered-layered' electrode material $(0.25Li_2MnO_3 \cdot 0.75LiMn_{0.375}Ni_{0.375}Co_{0.25}O_2$ (left)), an untreated, underlithiated 'layered-layered-spinel' derivative ('layered-layered' $0.25Li_2MnO_3 \cdot 0.75LiMn_{0.375}Ni_{0.375}Co_{0.25}O_2$ (middle)), and an Al-surface treated 'layered-layered-spinel derivative ('layered-layered' $0.25Li_2MnO_3 \cdot 0.75LiMn_{0.375}Ni_{0.375}Co_{0.25}O_2$ (right)). Corresponding dQ/dV plots of the electrochemical profiles are provided in FIG. 5.

Figure 5:
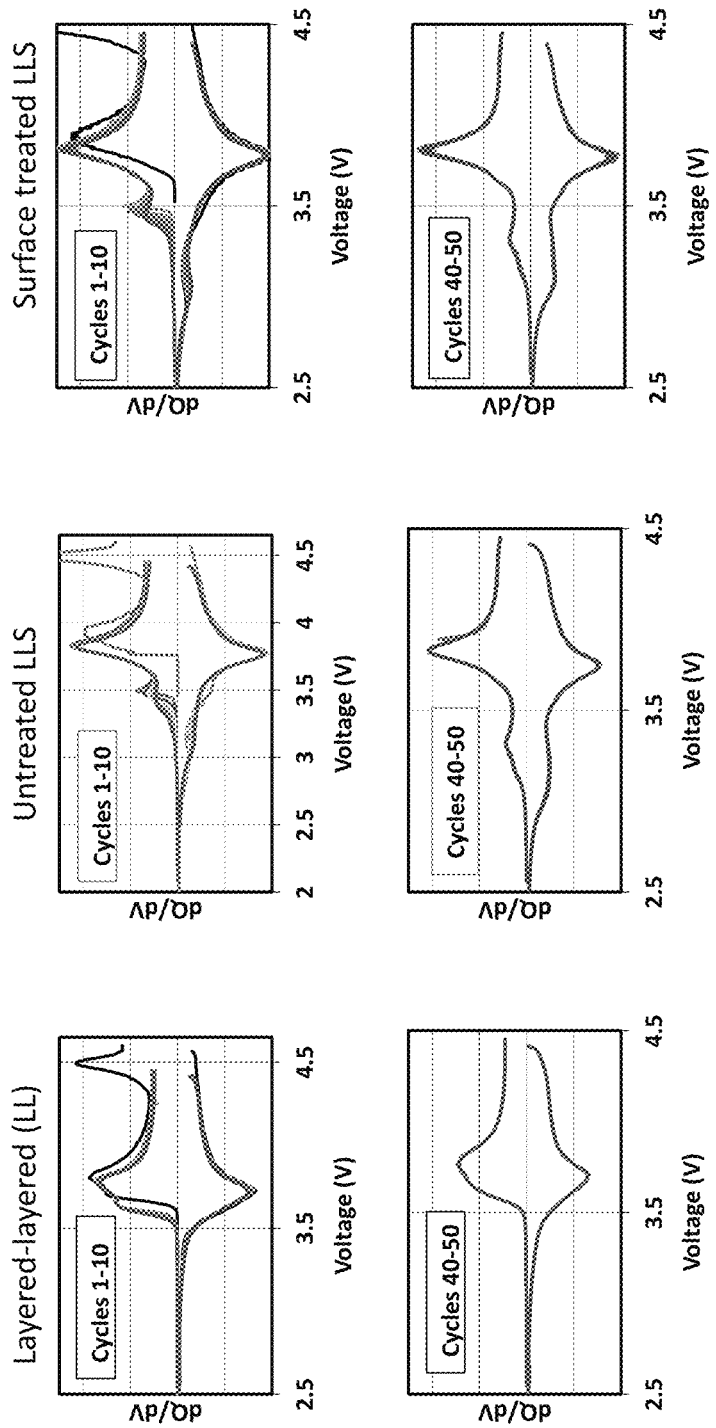
FIG. 5 depicts corresponding dQ/dV plots of the electrochemical profiles in FIG. 4.
Figure 6:
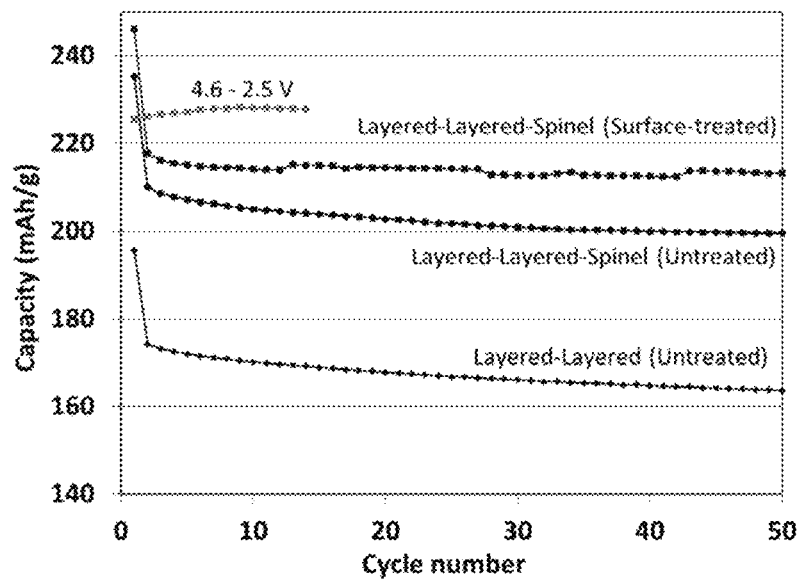
FIG. 6 depicts capacity versus cycle number plots for lithium half cells with a parent LL (untreated) electrode (bottom), an underlithiated, untreated LLS electrode ($2^{nd}$ from bottom), an underlithiated, Al-surface-treated LLS electrode ($2^{nd}$ from top) when cycled between 4.5 and 2.5 V after a first-cycle activation between 4.6 and 2.0 V (15 mA/g, 30° C.); and an underlithiated, Al-surface-treated LLS electrode when cycled continuously between 4.6 and 2.5 V after a first-cycle activation between 4.6 and 2.0 V (15 mA/g, 30° C.) (top).

The electrochemical data in FIG. 4 and FIG. 5 clearly demonstrate the improvement in electrochemical capacity that can be gained by creating a 'layered-layered-spinel' electrode by underlithiating a parent 'layered-layered' electrode composition, as already disclosed by Long et al. However, the additional capacity that can be gained by surface treatment of the 'layered-layered-spinel' electrode as taught herein to yield a capacity close to 220 mAh/g, is remarkable because it opens the door for further exploitation and improvement. Indeed, widening the operating voltage window to allow continuous cycling of the lithium half cell between 4.6-2.5 V, after a first-cycle activation between 4.6 and 2.0 V (15 mA/g, 30° C.), increases the delivered capacity to almost 230 mAh/g, as shown in the capacity vs. cycle number plots in FIG. 6 for the first 14 cycles: capacity vs. cycle number plots for lithium half cells with a parent 'layered-layered' (untreated) electrode (bottom), an underlithiated, untreated 'layered-layered-spinel' electrode (2nd from bottom), an underlithiated, Al-surface-treated 'layered-layered-spinel' electrode (2nd from top) when cycled between 4.5 and 2.5 V after a first-cycle activation between 4.6 and 2.0 V (15 mA/g, 30° C.); and an underlithiated, Al-surface-treated 'layered-layered-spinel' electrode when cycled continuously between 4.6 and 2.5 V after a first-cycle activation between 4.6 and 2.0V (15 mA/g, 30° C.) (top).

Example 5

Figure 7:
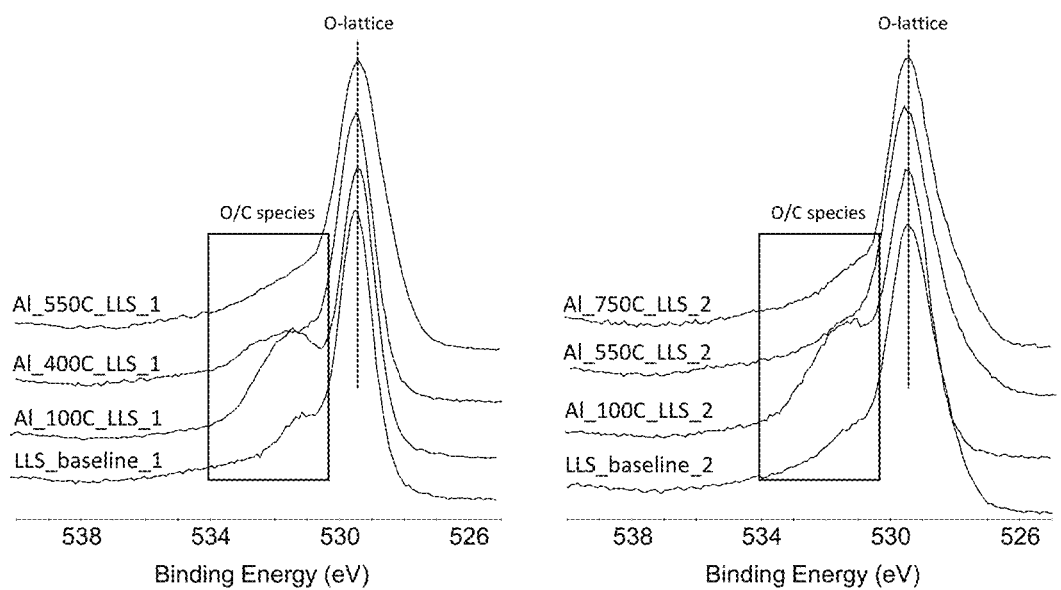
FIG. 7 depicts the XPS data of LLS electrodes after Al-treatment and drying/annealing at various temperatures.

Two baseline structurally-integrated 'layered-layered-spinel' electrode materials (labeled: LLS_baseline_1 & LLS_baseline_2) prepared by different methods were treated with the same aluminum surface treatment. After the initial aluminum treatment, the samples were heated to different temperatures. The samples were analyzed by X-ray photoelectron spectroscopy (XPS). FIG. 7 summarizes the O 1s spectra for each series. In each series, the sample treated at 100° C. exhibits a distinct peak near 531.5 eV (near the reported value of O binding energy in $Al_2O_3$) when compared to samples treated at higher temperatures and with respect to the baseline.

Table 1 summarizes the surface composition (atomic %) of each sample in the series. The analyses indicate that (1) the data obtained from the two samples are generally in excellent agreement with one another; (2) there is no aluminum in the baseline samples; (3) the aluminum concentration at the surface of the treated samples decreases as the processing temperature is increased above approximately 100° C.; (4) the magnitude of the XPS peak at approximately 531.5 eV (adjacent to a relatively intense peak at approximately 529.5 eV) is strongest for the best performing Al-treated electrodes that had been dried at approximately 100° C., indicating that the XPS technique can be used as a quality control yardstick to identify optimum surface compositions and surface-treatment temperatures for the electrode materials of this invention.

TABLE 1

Surface analyses of various layered-layered-spinel (LLS) samples by XPS, with values expressed as atomic percentages (at. %).

| | Surface Composition (at. %) | | | | | | | | |
|---|---|---|---|---|---|---|---|---|---|
| | Al | Li | Ni | Mn | Co | O | C | Na | N | B.E-Al |
| LLS_baseline_1 | 0.0 | 27.0 | 5.3 | 5.8 | 2.6 | 34.0 | 19.2 | 6.1 | 0.0 | — |
| Al_100 C._LLS_1 | 3.51 | 26.9 | 5.0 | 5.7 | 2.1 | 38.1 | 14.8 | 3.5 | 0.4 | 73.8 |
| Al_400 C._LLS_1 | 2.58 | 28.9 | 4.9 | 6.1 | 2.2 | 34.7 | 13.9 | 6.0 | 0.7 | 73.3 |
| Al_550 C._LLS_1 | 1.91 | 26.1 | 5.7 | 6.3 | 2.8 | 36.5 | 13.1 | 7.2 | 0.5 | 72.8 |
| LLS_baseline_2 | 0.0 | 23.4 | 5.4 | 6.6 | 2.8 | 36.6 | 19.7 | 5.6 | 0.0 | — |
| Al_100 C._LLS_2 | 3.0 | 25.1 | 5.2 | 5.5 | 2.1 | 39.5 | 16.2 | 3.1 | 0.5 | 73.8 |
| Al_550 C._LLS_2 | 1.7 | 24.0 | 5.4 | 5.9 | 2.4 | 37.0 | 18.3 | 5.3 | 0.0 | 73.0 |
| Al_750 C._LLS_2 | 0.6 | 21.6 | 4.9 | 5.9 | 2.3 | 34.6 | 25.1 | 5.0 | 0.0 | 74.7 |

Example 6

One unique aspect of the low temperature (e.g., <200° C.) surface treatment described herein is that it unexpectedly displays a surprising synergy when used in combination with certain additives. In particular, the performance of the additive LiDFOB (lithium difluoro(oxalate)borate) is dramatically improved in combination with the low temperature aluminum treatment. Moreover, this additive performed best in combination with the Al surface treatment when used in very low concentrations of just 0.5 wt %. Although LiDFOB is a previously known additive, reports have shown that, in combination with GEN2-type electrolytes (e.g., 1.2 M LiPF$_6$ in EC:EMC; 3:7 w/w), as much as 2% LiDFOB is needed to optimize the performance of lithium- and manganese-rich electrodes (e.g., LL or LLS materials). See Zhue et al., *J. Electrochem. Soc.*, 159, A2109 (2012). Furthermore, even with the optimized amount of LiDFOB (e.g., 2%), the impedance of such cells reportedly still increased significantly after cycling. The same authors have also reported that the additive LiDFOB does not significantly improve impedance rise and may, in some cases, negatively impact it. See Abraham et al., *J. Power Sources*, 15, 612 (2008).

Figure 8:
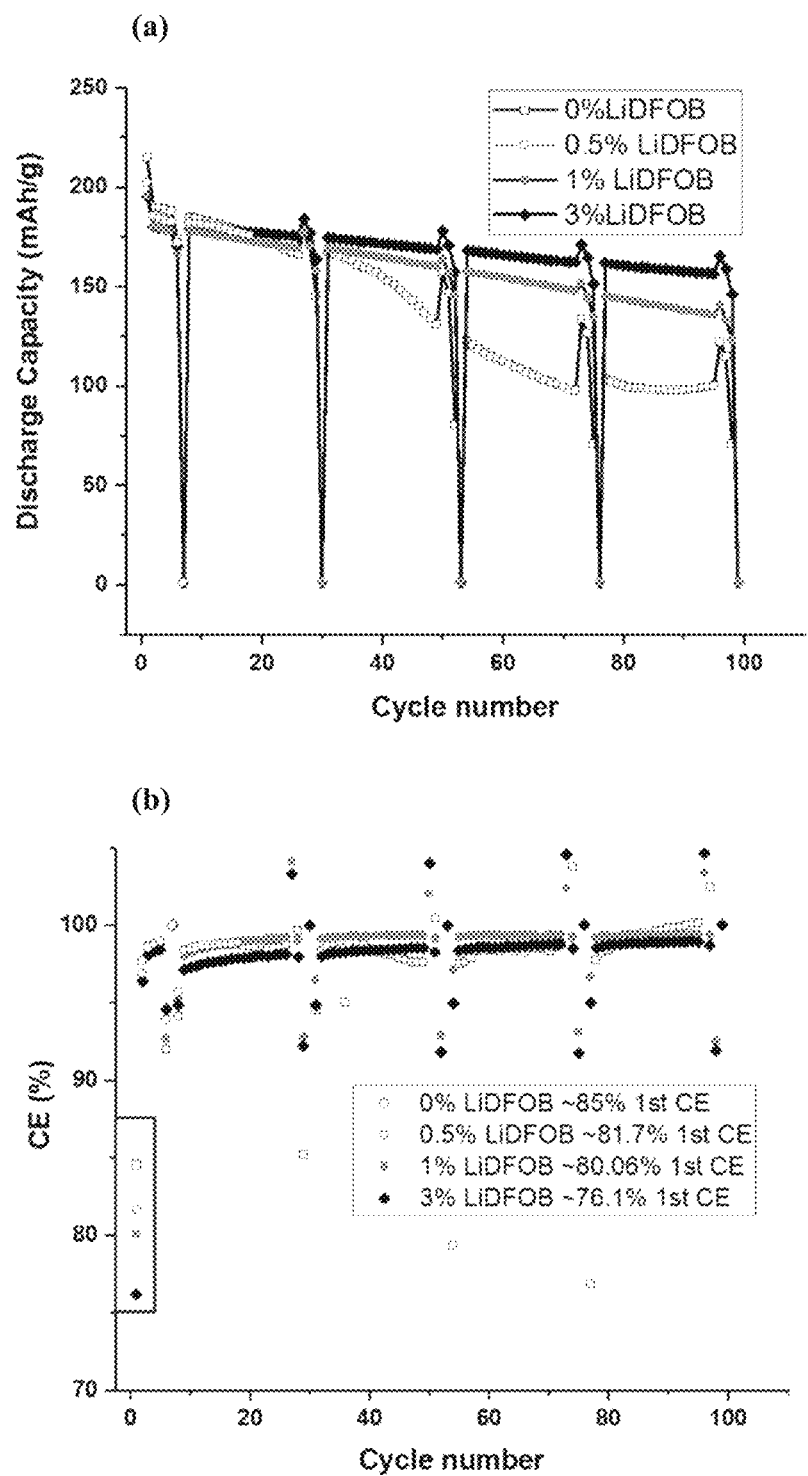
FIG. 8 shows (a) a plot of discharge capacity versus cycle number for LLS//Gr cells cycled with LiDFOB as an additive from 0-3% (wt.); and (b) coulombic efficiencies for the cells shown in (a); at 4.4-2.5V vs. graphite, C/2 ageing cycles, 3-hour holds at the top of each charge; breaks in the cycling data represent diagnostic cycles for collecting impedance data

FIG. 8, Panel (a), shows the cycling performance of LLS//Gr cells cycled with LiDFOB as an additive in concentrations of 0, 0.5, 1.0, and 3.0 wt % without any surface treatment of the LLS cathode material ("baseline" LLS=0.25Li$_2$MnO$_3$.(1−x)LiMn$_{0.375}$Ni$_{0.375}$Co$_{0.25}$O$_2$, with a targeted 15% spinel content; and Gr=graphite). Clearly the addition of LiDFOB improved the capacity performance of cells, however, as much as 3 wt % was needed for optimal performance. In addition, FIG. 8, Panel (b), shows that as the additive wt % is increased, coulombic efficiencies decrease, indicating an increase in unwanted side reactions associated with additional LiDFOB.

Figure 9:
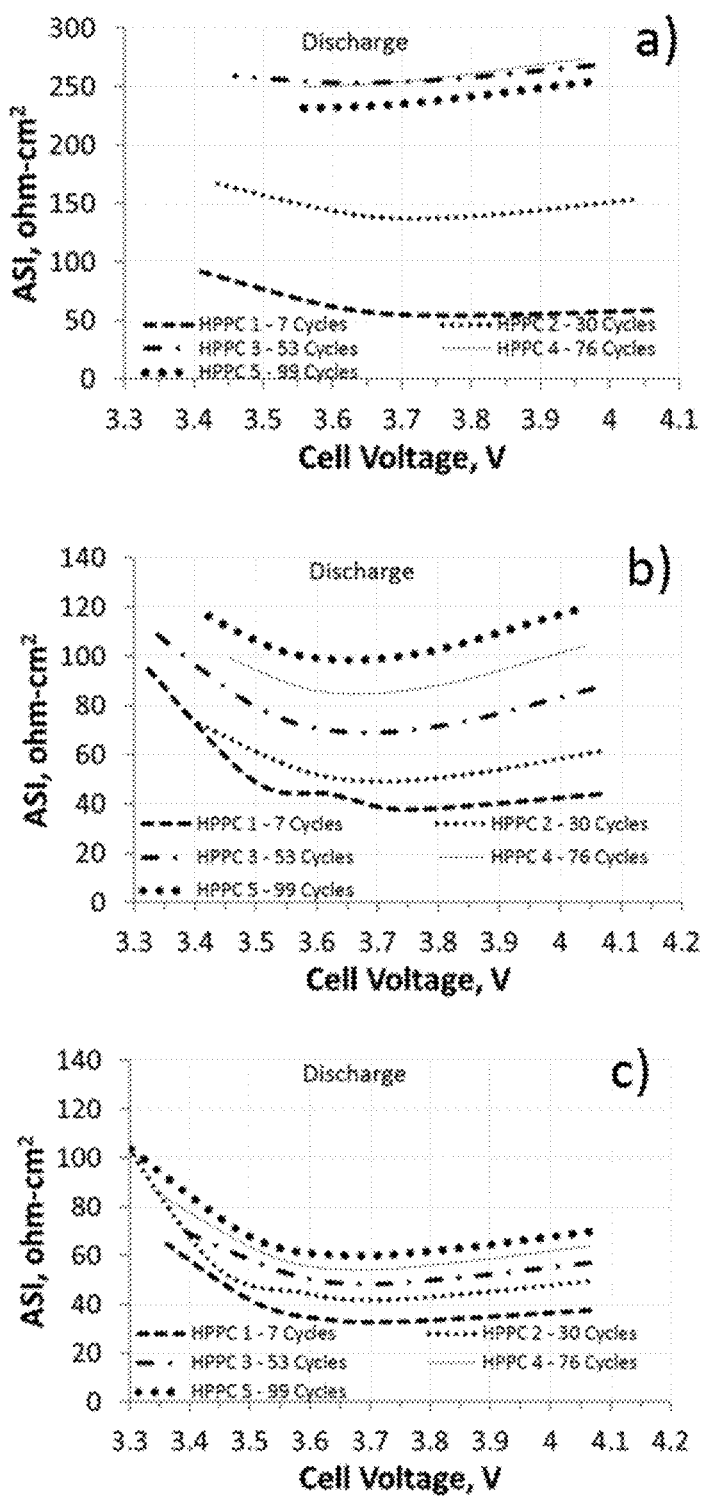
FIG. 9 depicts area specific impedance (ASI, $\Omega \cdot cm^2$) for LiDFOB containing cells: (a) 0% LiDFOB; (b) 1 wt % LiDFOB; and (c) 3 wt % LiDFOB.

FIG. 9, Panels (a)-(c), show discharge impedance as a function of cycle number for LiDFOB containing cells. It is noteworthy that increasing concentrations of LiDFOB led to decreasing impedance rise, with the 3% LiDFOB showing the best performance, in agreement with the cycling data of FIG. 8. However, even the optimized (3 wt %) cells showed an increase of impedance that is nearly double the initial value. The 1 wt % LiDFOB cells showed significant impedance rise with cycling. Clearly, as reported, the LiDFOB additive alone (i.e., without the surface treatment described herein) does not eradicate impedance in these cells and larger concentrations are needed to realize substantial improvements; however, at the cost of lower efficiencies.

Figure 10:
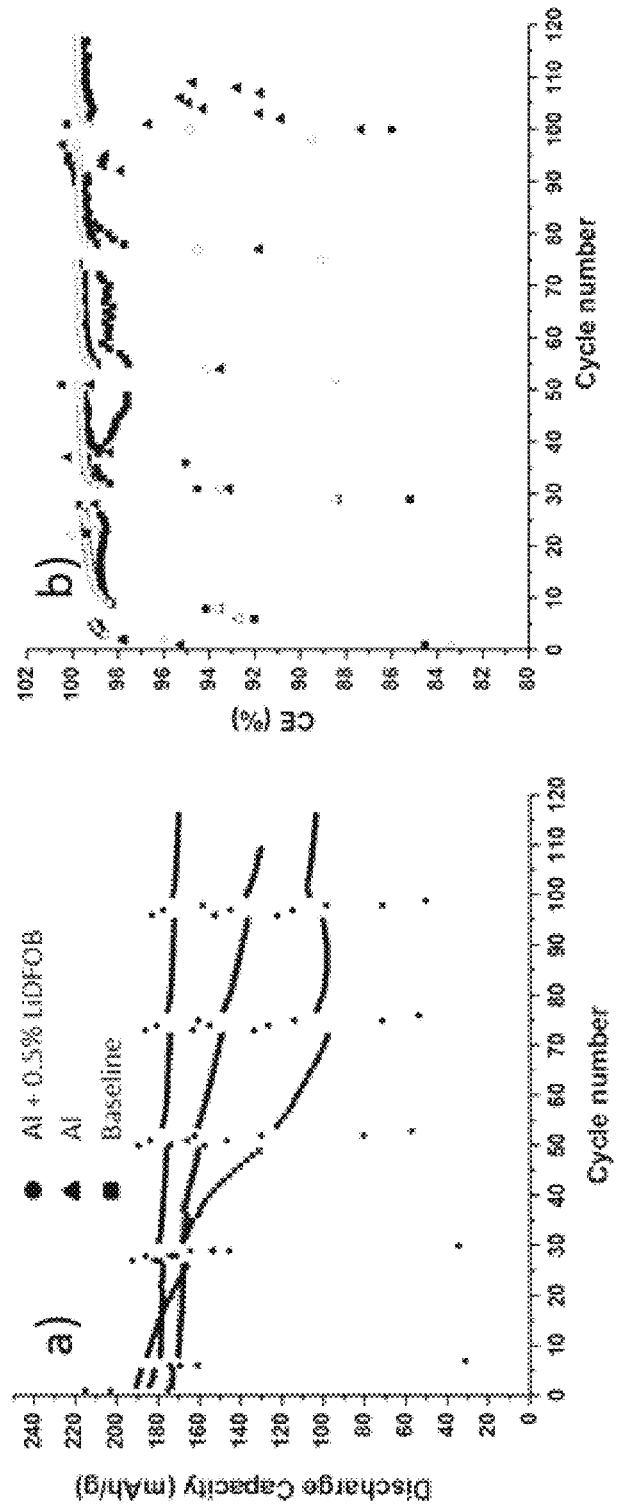
FIG. 10 depicts (a) capacity versus cycling data for un-treated LLS compared with Al-treated LLS with and without 0.5% (wt.) LiDFOB as an additive against graphite anodes; and (b) coulombic efficiencies for the cells shown in (a); at 4.4-2.5V vs. graphite, C/2 ageing cycles, 3-hour holds at the top of each charge; breaks in the cycling data represent diagnostic cycles for collecting impedance data.
Figure 11:
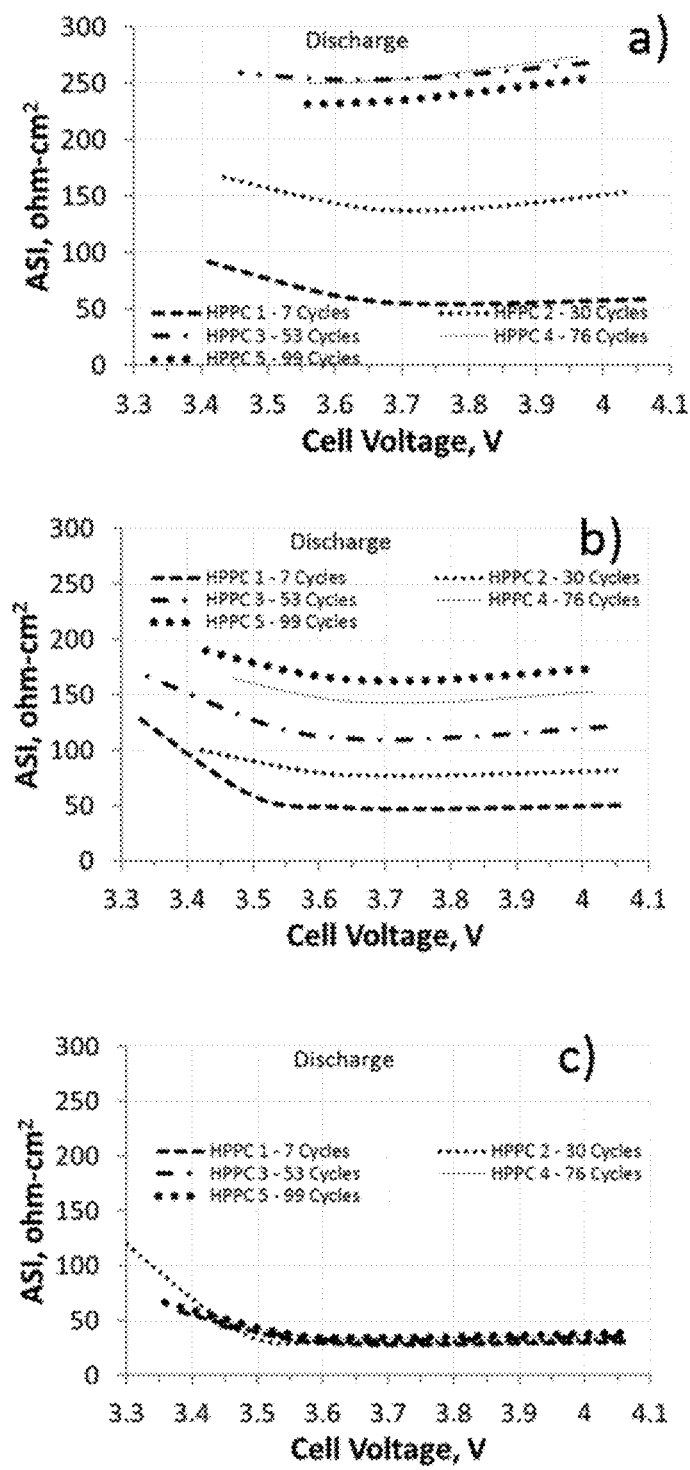
FIG. 11 shows area specific impedance (ASI, $\Omega \cdot cm^2$) for (a) untreated LLS//Gr cells; (b) Al treated LLS//Gr cells; and (c) Al treated LLS//Gr cells containing 0.5 wt % LiDFOB.

FIG. 10 shows capacity vs cycling data for un-treated LLS compared with Al-treated LLS with and without 0.5% (wt.) LiDFOB as an additive against graphite anodes. As per the invention, the low-temperature Al treatment alone significantly improves the cycling performance of the LLS//Gr cells. Surprisingly, the addition of just 0.5 wt % LiDFOB markedly improves the performance of the Al-treated cells. Furthermore, the coulombic efficiencies of FIG. 10, Panel (b), are also improved over the baseline and Al-treated cells. Notably, the efficiencies of the Al/LiDFOB combination are the highest of all cells, including the LiDFOB only cells. Clearly there is a unexpected synergistic relationship between the low temperature Al treatment and very small amounts (e.g., 0.5 wt %) of the additive LiDFOB, where the combination improves both capacity retention and impedance with cycling beyond the individual treatments. Of particular note is the impedance. As shown in FIG. 11, the impedance rise with cycling for the Al-treated samples, while improved over the untreated samples, displays a measurable rise under this relatively harsh protocol (e.g., 3 hour holds at the top of each ageing cycle). However, as shown in FIG. 11, Panel (c), the combination of the low temperature Al treatment and just 0.5 wt % LiDFOB not only lowers the initial impedance, but also no observable rise in impedance was evident over the approximate 100 cycles tested for impedance. This is clearly in contrast with the cells having no Al treatment and LiDFOB as an additive, in any wt % tested. Therefore, the improved performance of these cells can only be attributed to the surprising synergistic interaction of the two treatments; low temperature Al and low concentrations of LiDFOB.

Figure 12:
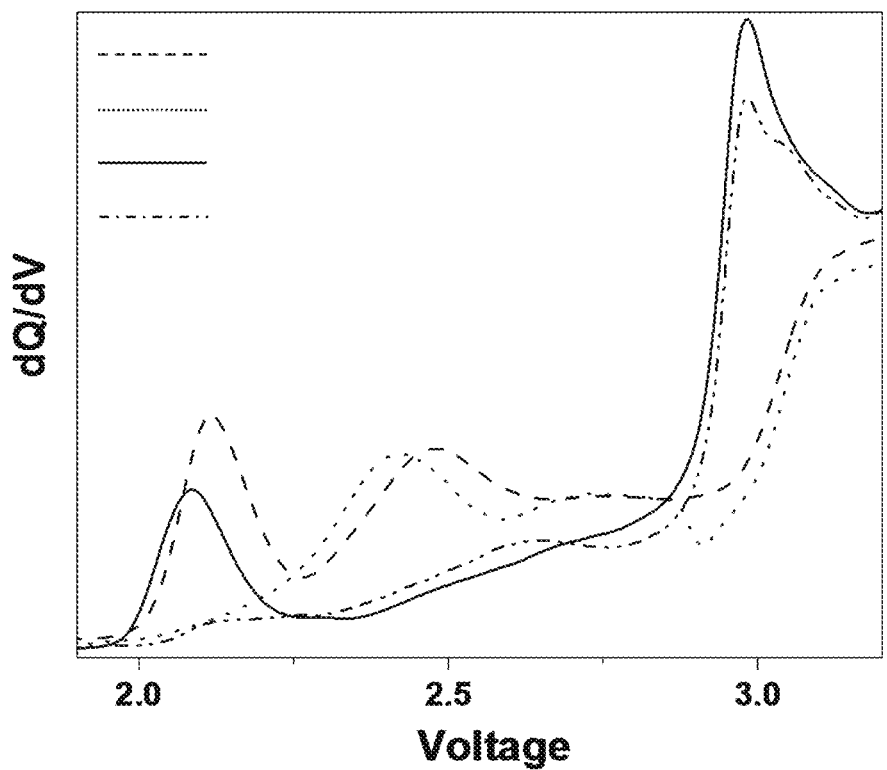
FIG. 12 provides dQ/dV plots of the first cycle charge of LLS//Gr cells containing Al-treated LLS with and without LiDFOB additive as marked in the legend.

FIG. 12 shows dQ/dV plots of the first formation cycles of LLS//Gr cells with and without Al treatment and LiDFOB additive. The baseline, untreated (dash-dot line) shows a fairly featureless profile except for the large, convoluted, double peak at about 3.0 V. This peak does not appear on subsequent cycles (not shown for clarity) and thus represents an irreversible reaction, likely tied to decomposition of surface phases on the baseline electrode. Several changes were observed for the samples that received the low temperature Al treatment (dotted line). First, a new decomposition peak appeared at about 2.4 V and subsequently, the large decomposition peak at about 3.0 V was significantly suppressed. This data reiterates the ability of the low temperature Al treatment to alter the surface chemistry of the baseline LLS cathode. The addition of 0.5 wt % LiDFOB to the baseline cells (solid line) resulted in a peak just above 2.0 V. This peak was not present in the baseline and thus signals the decomposition of the additive. However, the LiDFOB did not significantly affect the large peak at about 3.0 V as in the case of the Al treatment. The combination of the Al treatment and 0.5 wt % LiDFOB resulted in the decomposition of the additive along with the Al-related process at about 2.4 V, which was shifted to slightly higher potential, and the suppression of the reaction that occurs at about 3.0 V.

Based on this data it is believed that the low temperature metal treatments, along with their ability to enhance cathode surface properties, allow an interaction between the additive and surface-deposited species (e.g., metal, metal-hydroxides, metal-oxyhyroxide, hydroxide, etc.), especially in the first few formation cycles as the additive and surface-deposited species react with electrode surfaces. As such, various elements (e.g., Mg, Ni, Co, Mn), when used in combination with the low temperature treatment of the invention, may have varying degrees of activity with additives such as LiDFOB, or others, and show similar or better performance improvements due to the formation of unique surfaces phases that may not be formed otherwise due to the combination of, and/or chemical/electrochemical reactions between, surface components; for example, lithium/oxygen leached from the surfaces as in Example 1, surface/residual lithium species (e.g., LiOH, $Li_2CO_3$) present in the starting metal oxides (e.g., LLS) additives (e.g., LiDFOB), and coating elements (e.g., Mg, Ni, Co, Mn).

Example 7

Figure 13:
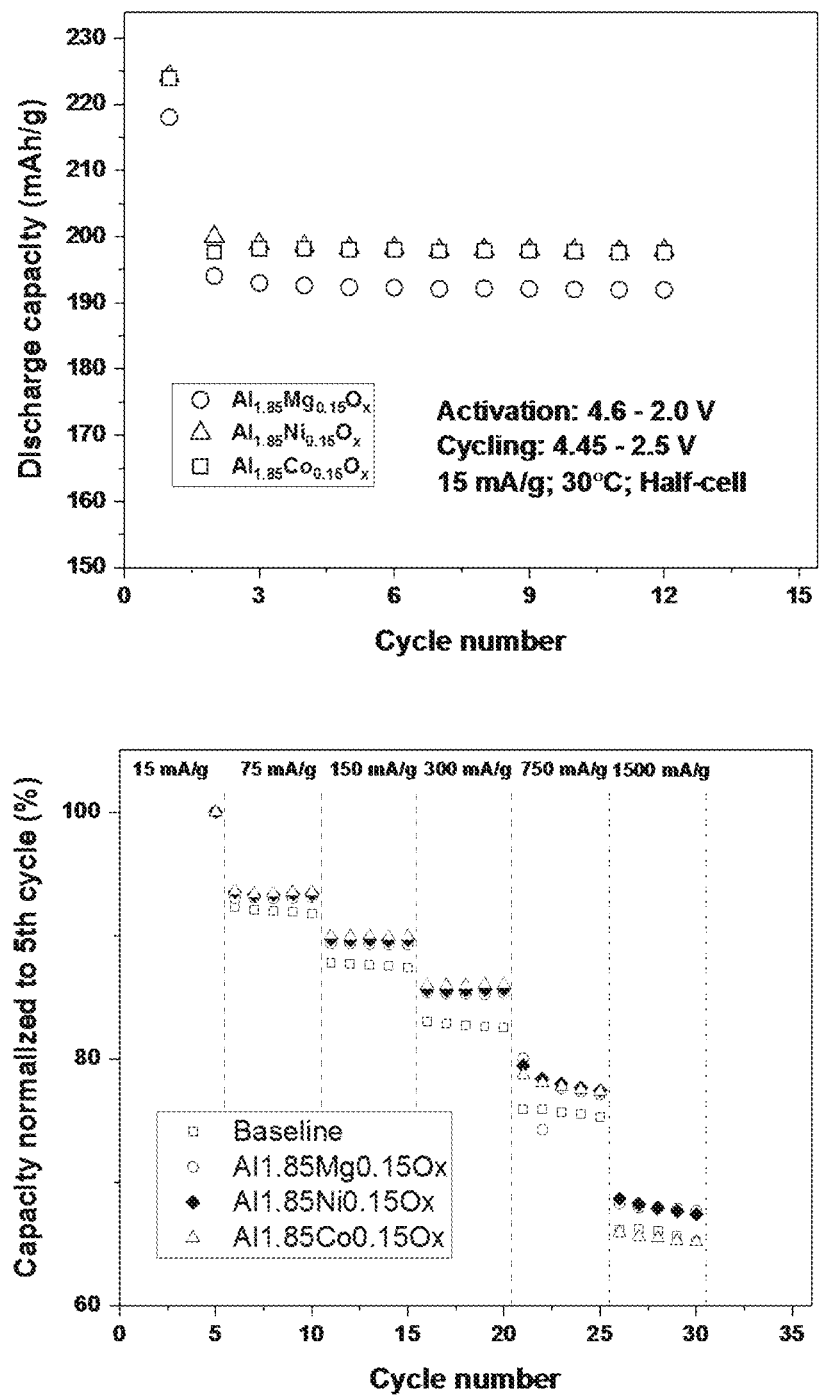
FIG. 13 illustrates (a) capacity versus cycle number for LLS//Li cells where the LLS powders have been treated with stoichiometric amounts of $Al_{1.85}Mg_{0.15}O_x$, $Al_{1.85}Ni_{0.15}O_x$, and $Al_{1.85}Co_{0.15}O_x$ using nitrate precursors in aqueous solution, followed by annealing at about 110° C.; and (b) capacity normalized to the 5th cycle.

Another unique aspect of the low temperature treatments described herein is that they have been found to work with a combination several metallic elements. For example, FIG. 13, Panel (a), shows the capacity vs. cycle of the baseline LLS composition described in Example 6, treated with a solution of Al nitrate as described herein, with the addition of Mg nitrate, Ni nitrate, or Co nitrate in quantities described by $Al_{1.85}Mg_{0.15}O_x$, $Al_{1.85}Ni_{0.15}O_x$, and $Al_{1.85}Co_{0.15}O_5$, respectively (i.e., before possible reaction with leached/surface lithium, or additives). The data show that these example combinations are also able to improve the capacity retention of the LLS materials. In addition, as shown in FIG. 13, Panel (b), the rate capability (% retention of ~C/12 capacity) as a function of increasing discharge rate is better than the untreated baseline for all three samples.

Electrochemical Cells and Batteries.

Figure 14:
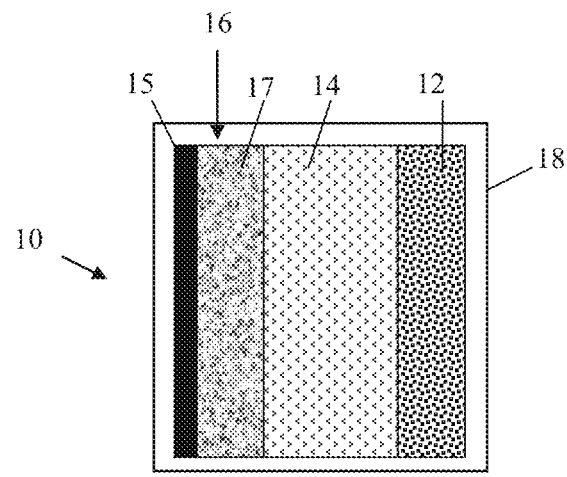
FIG. 14 depicts a schematic representation of an electrochemical cell.
Figure 15:
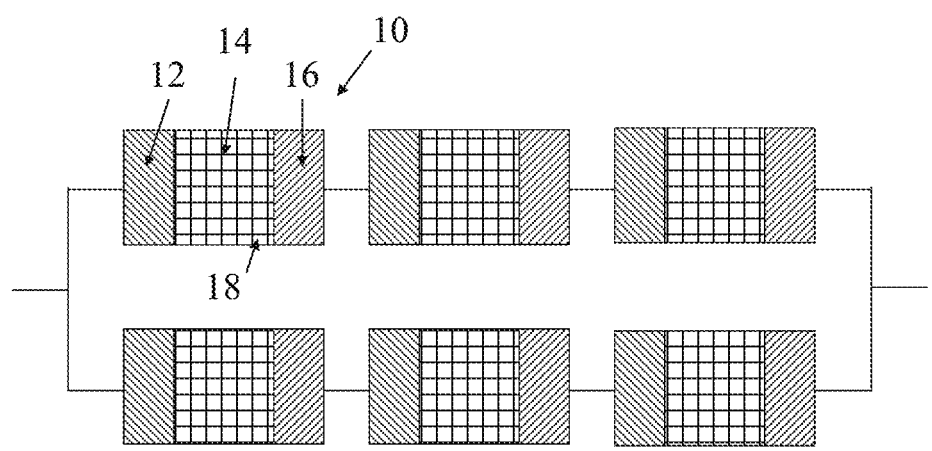
FIG. 15 depicts a schematic representation of a battery consisting of a plurality of cells connected electrically in series and in parallel.

A detailed schematic illustration of an electrochemical cell 10 of the invention is shown in FIG. 14. Cell 10 comprises negative electrode 12 separated from positive electrode 16 by an electrolyte 14, all contained in insulating housing 18 with suitable terminals (not shown) being provided in electronic contact with negative electrode 12 and positive electrode 16. Negative electrode 12 comprises an active material such as graphite or the surface-treated lithium metal oxide described herein. Positive electrode 16 comprises metallic collector plate 15 and active layer 17 comprising a lithium metal oxide material, such as the surface-treated lithium metal oxide material described herein. Binders and other materials, such as carbon, normally associated with both the electrolyte and the negative and positive electrodes are well known in the art and are not described herein, but are included as is understood by those of ordinary skill in this art. FIG. 15 provides a schematic illustration of one example of a battery in which two strings of electrochemical sodium cells 10, described above, are arranged in parallel, each string comprising three cells 10 arranged in series.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Embodiments of the invention in which an exclusive property or privilege is claimed as defined as follows:

1. An electrode for a non-aqueous electrochemical cell comprising an active lithium metal oxide material coated on a current collector; wherein the active lithium metal oxide material is prepared by a method comprising the sequential steps of:
    (a) contacting a first lithium metal oxide material with an aqueous acidic solution containing one or more metal cations; and
    (b) heating the so-contacted first lithium metal oxide material from step (a) to dryness at a temperature below 200° C. to form the active lithium metal oxide material;
    wherein the metal cations in the aqueous acidic solution comprise one or more metal cations selected from the group consisting of an alkaline earth metal ion, a transition metal ion, and aluminum ion; and wherein the first lithium metal oxide material in step (a) comprises a compound with a structurally-integrated layered-layered structure comprising $xLi_2MnO_3 \cdot (1-x)LiMO_2$ or a layered-layered-spinel structure comprising $y[xLi_2MnO_3 \cdot (1-x)LiMO_2] \cdot (1-y)LiM''_2O_4$, in which M and M" comprise one or more metal ions for $0<x<1$ and $0<y<1$.

2. The electrode of claim 1, wherein M and M" comprise one or more metal ions selected from the group consisting of Mn, Ni, and Co cations, and optionally, one or more other metal ions selected from the group consisting of Al, Mg and Li cations.

3. The electrode of claim 1, wherein the active lithium metal oxide material comprises Mn and Ni in an atomic ratio of Mn:Ni greater than or equal to 1.

4. The electrode of claim 1, wherein the active lithium metal oxide material comprises Mn, Ni and Co in an atomic ratio of Mn:(Ni+Co) greater than or equal to 1.

5. The electrode of claim 1, wherein the aqueous acidic solution comprises aluminum ion and the active lithium metal oxide material exhibits a peak of about 531.5 eV adjacent to a peak at about 529.5 eV in an XPS spectrum of the material.

6. An electrochemical cell comprising a cathode, an anode, a separator membrane between the cathode and the anode, and a lithium-containing electrolyte contacting the anode, the cathode, and the membrane, wherein either the cathode or the anode is the electrode of claim 1.

7. The electrochemical cell of claim 6, wherein the electrolyte comprises up to about 1 percent by weight of lithium difluoro(oxalate)borate (LiDFOB).

8. A battery containing more than one electrochemical cell of claim 7, connected in series, in parallel, or in both series and parallel.

* * * * *